(12) United States Patent
Gu et al.

(10) Patent No.: US 7,204,771 B2
(45) Date of Patent: Apr. 17, 2007

(54) BIDIRECTIONAL CONTINUOUS POWER TRANSMISSION SYSTEM

(75) Inventors: Huang-Lung Gu, Chutung Hsinchu (TW); Chun-Hsien Lu, Hsinchu (TW); Tseng-Te Wei, Hsinchu (TW); Chien-Tsung Wu, Hsinchu Hsien (TW); Shian-Hsua Huang, Hsinchu (TW)

(73) Assignee: Industrial Technology Research Institute, Hsin-Chu (TW)

( * ) Notice: Subject to any disclaimer, the term of this patent is extended or adjusted under 35 U.S.C. 154(b) by 608 days.

(21) Appl. No.: 10/702,951

(22) Filed: Nov. 5, 2003

(65) Prior Publication Data
US 2005/0096163 A1   May 5, 2005

(30) Foreign Application Priority Data
Sep. 12, 2003   (TW) ............................... 92125260 A

(51) Int. Cl.
*F16H 59/06* (2006.01)
*F16H 61/04* (2006.01)
*F16H 9/12* (2006.01)

(52) U.S. Cl. .......................................... 474/19; 474/13
(58) Field of Classification Search ............ 474/11–15, 474/18–19, 37, 43–45
See application file for complete search history.

(56) References Cited

U.S. PATENT DOCUMENTS 2,711,103 A * 6/1955 Miner ........................ 474/19
3,861,228 A * 1/1975 Adams ....................... 474/19
6,733,406 B2 * 5/2004 Kitai et al. ................. 474/13

FOREIGN PATENT DOCUMENTS

| JP | 58-142060 A | * | 8/1983 | |
| JP | 59-159455 A | * | 9/1984 | .................. 474/13 |
| JP | 62-124356 A | * | 6/1987 | .................. 474/13 |
| JP | 05-60192 A | * | 3/1993 | .................. 474/19 |
| JP | 05-332421 A | * | 12/1993 | .................. 474/45 |
| JP | 2001-355712 A | * | 12/2001 | |
| JP | 2002-227949 A | * | 8/2002 | |

* cited by examiner

*Primary Examiner*—Marcus Charles
(74) *Attorney, Agent, or Firm*—Tung & Associates

(57) ABSTRACT

A bidirectional continuous power transmission system, characterized by a projecting bolt moving within a guiding opening with a rear wall and a front wall. Upon a rotating movement, the projecting bolt exerts a force on the rear wall or the front wall, depending on the orientation of the rotating movement. The force has a component parallel to an axis of rotation, causing two halves of a driven wheel to be pressed together and against a transmission belt. By providing the rear wall and the front wall of the guiding opening with defined curvatures, well-defined forces are exerted at any speed in both orientations of the rotating movement, so that torque is continuously transmitted effectively in both directions.

18 Claims, 9 Drawing Sheets

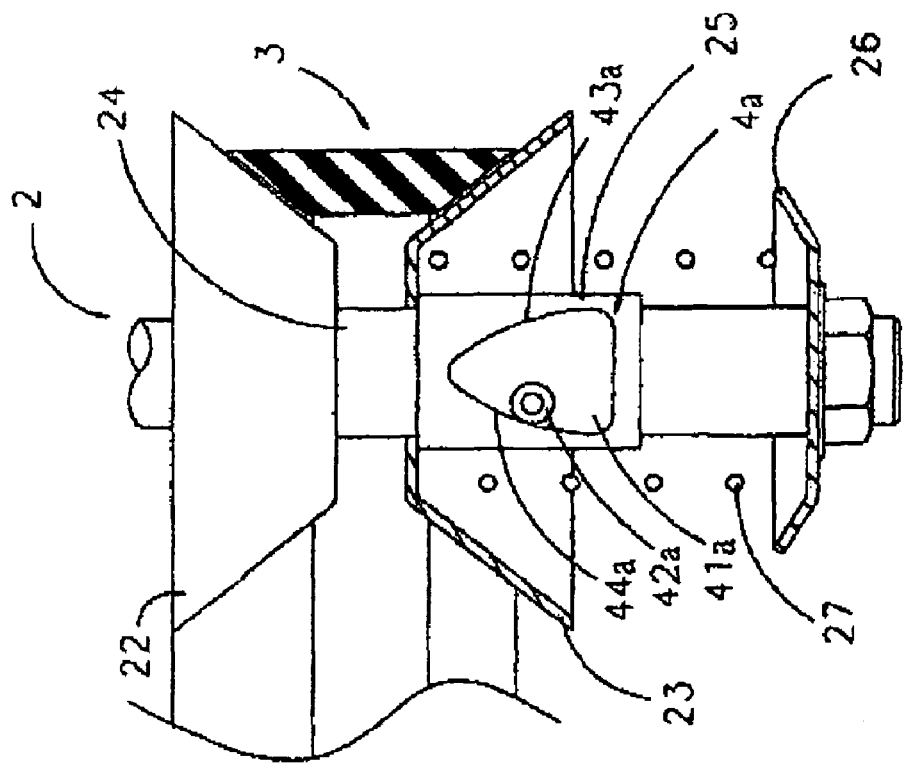
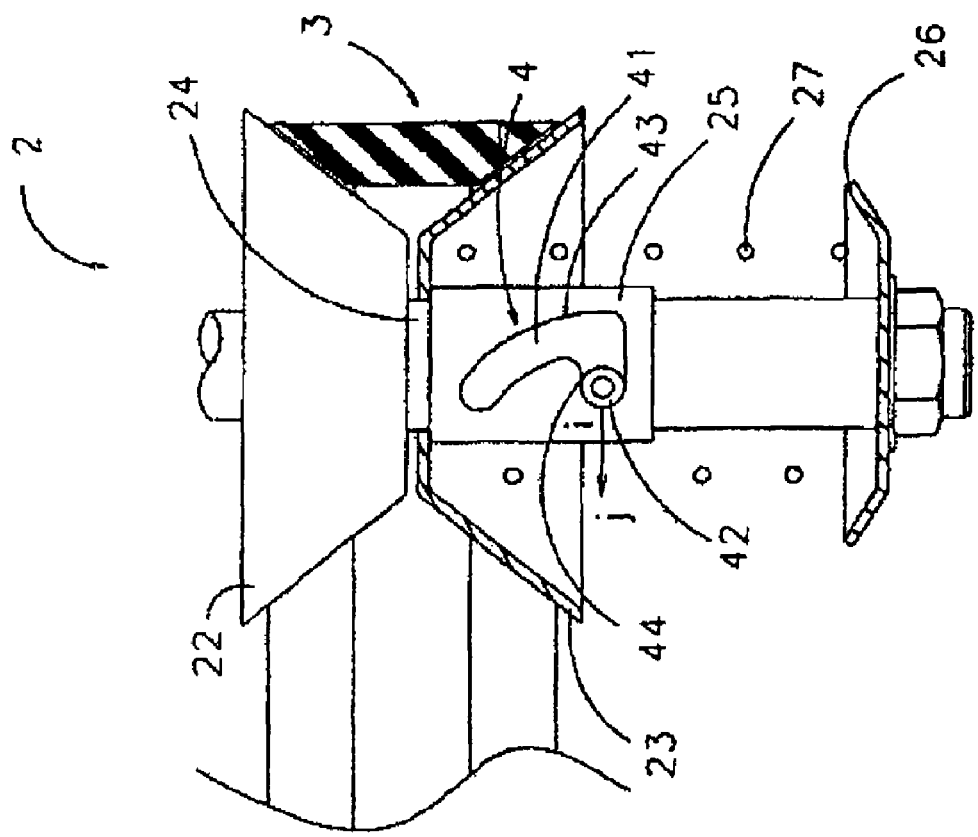
FIG 8
FIG 9a

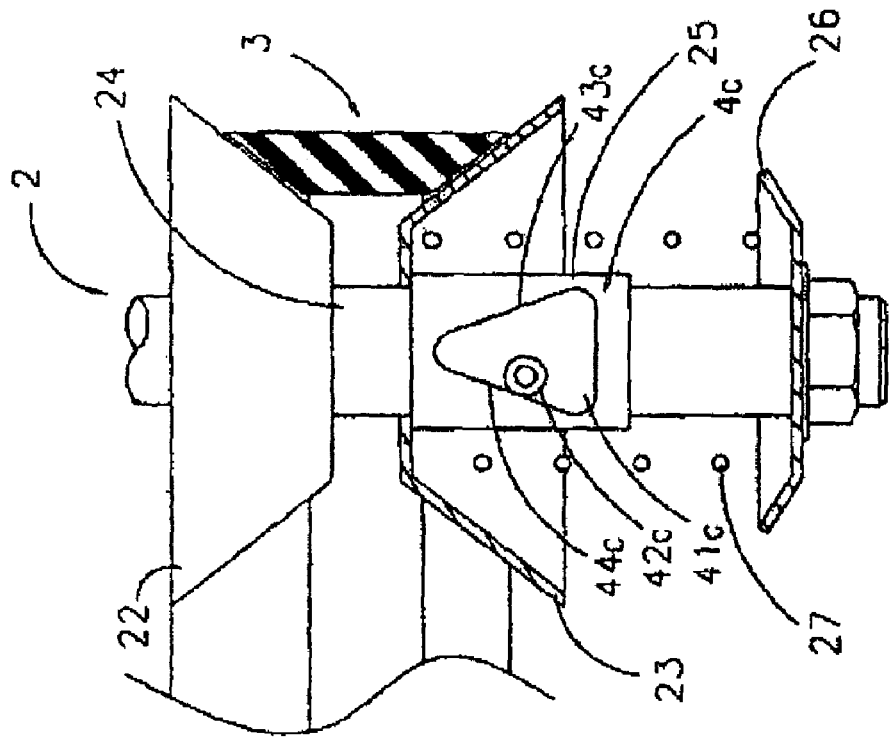
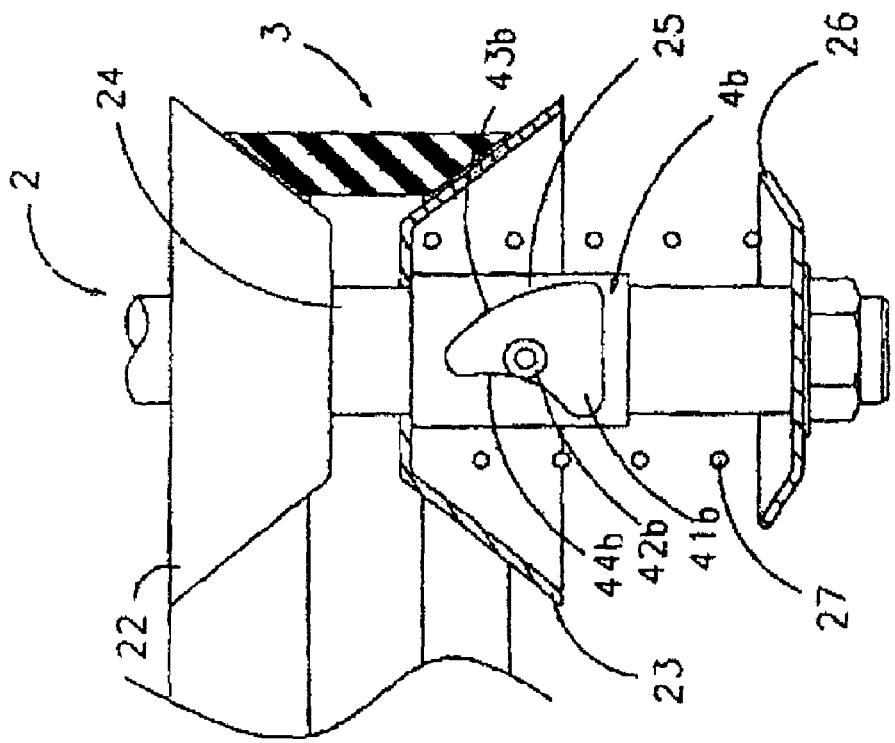

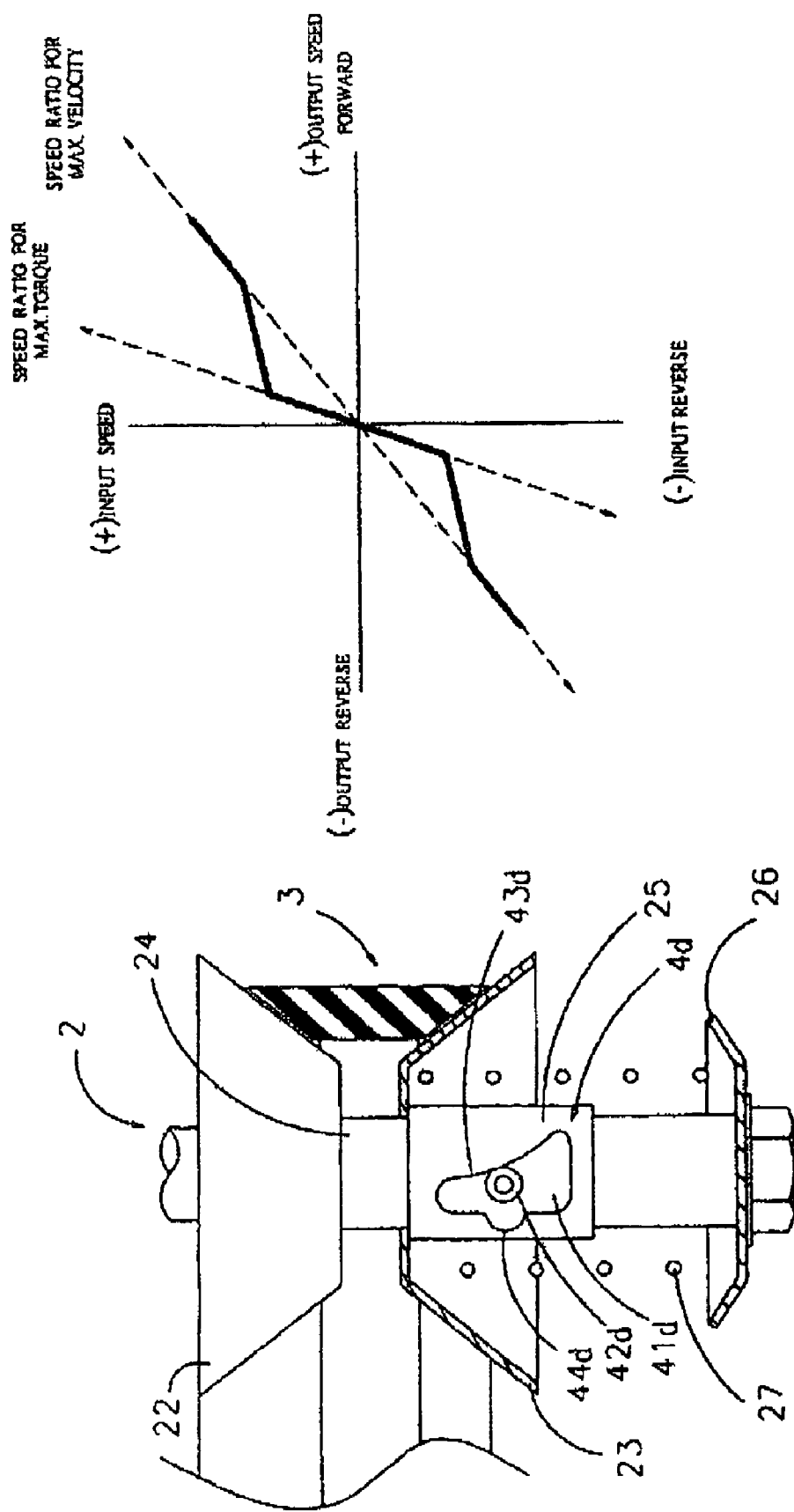

BIDIRECTIONAL CONTINUOUS POWER TRANSMISSION SYSTEM

FIELD OF THE INVENTION

The present invention relates to a bidirectional continuous power transmission system, particularly to a bidirectional continuous power transmission system having a torque cam assembly on a belt wheel that is able to rotate in both directions for use in a driving system which is continuous and bidirectional, like in machine tools or vehicles.

DESCRIPTION OF RELATED ART

Continuous power transmission systems are inexpensive and simple, offering output at a wide range of speeds, and therefore have become used as transmission systems.

There are mainly two types of continuous power transmission systems:

1. A rubber belt connects a driving belt wheel and a driven belt wheel with V-shaped cross-sections. The belt wheels contain lubricant, elsewhere, the system runs dry, without machine oil. This way, comparatively small torque can be transmitted.
2. A plurality of disks with V-shaped cross-sections made of metal or synthetic material form a chain which connects two wheels. The chain runs either dry or the assembly is housed in a casing filled with machine oil to provide sufficient lubrication.

For both types, each of the wheels consists of two half-wheels, as disclosed in Taiwan patent no. 499376 "continuous speed transmission system". For each wheel, one the two half-wheels is fixed on an axis, the other is movable along the axis for adjusting a circumference of the chain running over the wheel. Thus effective radii of the wheels are determined, resulting in continuous variation of speed transmission ratios.

In both types of continuous power transmission systems, the movable half-wheel have positions that are regulated by centrifugal force, external oil pressure or external electric magnets.

Continuous power transmission systems using belts transmit unidirectional force only. In reverse direction, the driving wheel runs idle and torque is not transmitted. Therefore, conventional continuous power transmission systems are not widely used.

The reason for restricting conventional continuous power transmission systems to unidirectional transmission of torque lies in the way one of the wheels or both wheels have at least one set of torque cams. Each set of torque cams comprises a projection and a depression respectively placed on one of the fixed half-wheels and movable half-wheels. For each wheel, upon rotation thereof, the projection pushes against an inner side of the depression, and a force is applied at a contact area with a component perpendicular to the axis of the wheel and a component parallel to the axis of the wheel. For each wheel, if the parallel component of the force is oriented towards the transmission belt, then the mobile half-wheel is moved towards the transmission belt, and friction between the transmission belt and the wheel increases, so that the transmission belt is taken along. On the other hand, if the parallel component of the force is oriented away from the transmission belt, then the mobile half-wheel is moved away from the transmission belt, and friction between the transmission belt and the wheel decreases, so that no torque is transmitted.

In conventional art, the two inner sides of the depression are parallel to each other. Upon rotation in positive direction, the component of force exerted by the projection that is oriented parallel to the axis is directed towards the transmission belt, so that the projection effectively transmits force. Upon rotation in reverse direction, the component of force exerted by the projection that is oriented parallel to the axis is directed away from the transmission belt, so that no transmission of force is possible.

Furthermore, for both machine tools and vehicles there is a demand for bidirectional power sources, like motors, air compressors or oil compressors. Internal combustion engines and external combustion engines having cylinders are also provided with reverse gears to convert unidirectional movements into bidirectional movements. Even if the power source is able to rotate bidirectionally, continuous torque conversion and transmission are performed unidirectionally only. Therefore, no inexpensive bidirectional continuous power transmission exists, instead, rather costly reverse gear devices have to be employed.

SUMMARY OF THE INVENTION

It is therefore an object of the present invention to provide a bidirectional continuous power transmission system having a primary belt wheel consisting of a primary fixed half-wheel and a primary movable half-wheel separately set about a primary axis and driven by a power source, a secondary belt wheel consisting of a secondary fixed half-wheel and a secondary movable half-wheel separately set about a secondary axis, and torque cam assemblies, each having a projection on the fixed half-wheel and a depression on the movable half-wheel, respectively, with the depression having a rear inner wall and a front inner wall of well-defined curvatures, such that a component parallel to the axis of a force exerted by the cam upon rotation in positive and in reverse direction is directed towards a transmission belt and torque is transmitted both in positive and reverse directions.

Another object of the present invention is to provide a bidirectional continuous power transmission system allowing different secondary speeds in two directions, with the first and second rails of the torque cam assemblies having different curvatures, so that in conjunction with the projection different secondary speeds in two directions result.

A further object of the present invention is to provide a bidirectional continuous power transmission system which allows to be used in conjunction with various types of power sources that are connected to the primary axis and operate bidirectionally, so that bidirectional power output is attained.

The present invention can be more fully understood by reference to the following description and accompanying drawings.

FIG. 8 is a schematic illustration of the torque cam assembly of the present invention during rotation in reverse direction.

FIG. 9a is a partial schematic illustration of the present invention in the second embodiment.

FIG. 9b is a partial schematic illustration of the present invention in the third embodiment.

FIG. 9c is a partial schematic illustration of the present invention in the fourth embodiment.

FIG. 9d is a partial schematic illustration of the present invention in the fifth embodiment.

FIG. 10 is a plot of the secondary speed against the first speed in the bidirectional continuous power transmission system of the present invention.

DETAILED DESCRIPTION OF THE PREFERRED EMBODIMENTS

Figure 1:
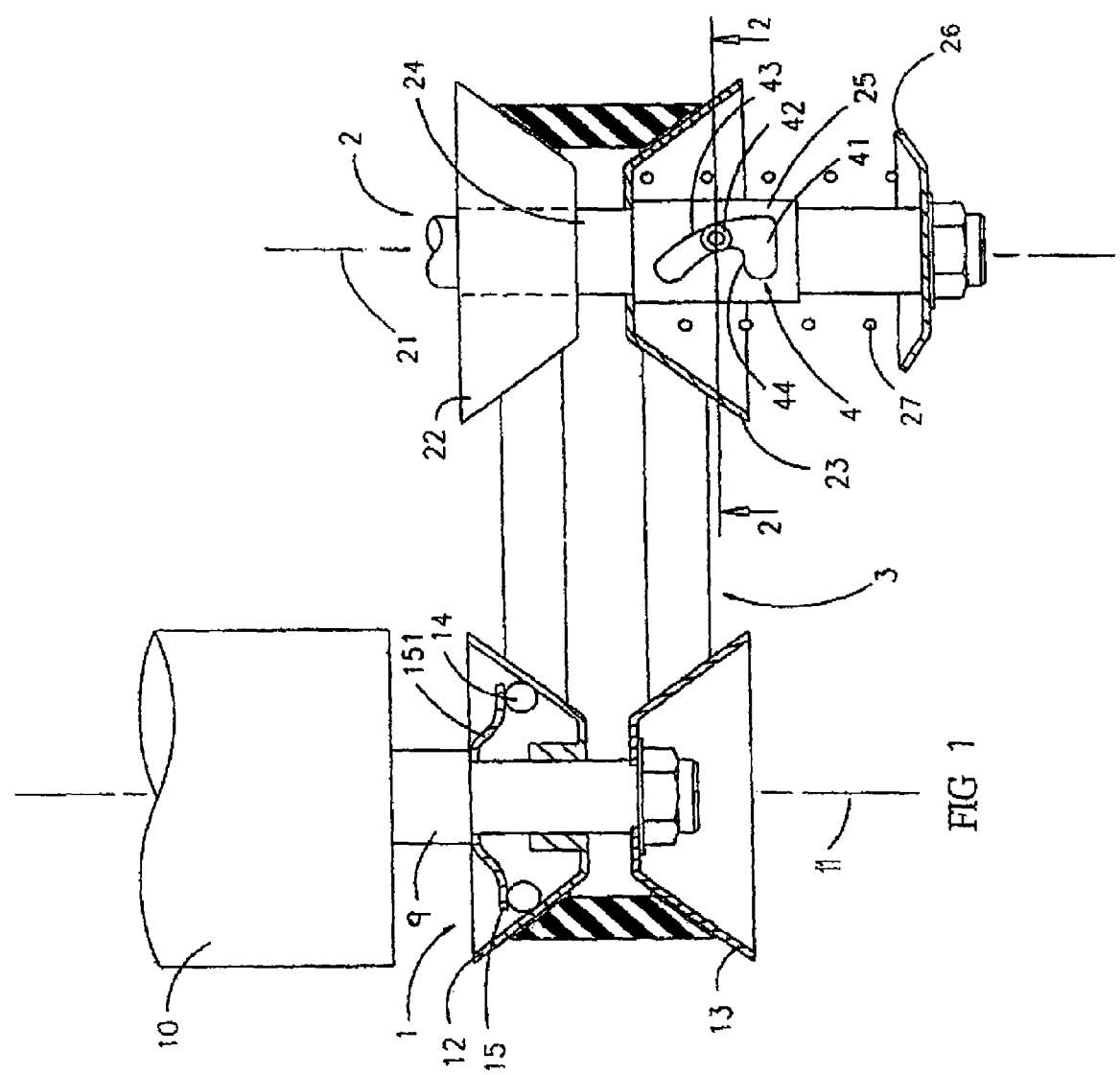
FIG. 1 is a partial sectional view of the bidirectional continuous power transmission system of the present invention.

The bidirectional continuous power transmission system of the present invention comprises: a primary belt wheel 1, mounted about a primary axis 11, which is connected with a power source 10 able to rotate in a positive direction and in a reverse direction; a secondary belt wheel 2, mounted about a secondary axis 21; a transmission belt 3, running over the primary and secondary belt wheel 1, 2; and a torque cam assembly 4, mounted on the secondary belt wheel 2. The primary axle 9 may be coupled to any suitable power source such as power source 10 shown in FIG. 1.

The above mentioned structural parts allow continuous transmission of torque in the positive and reverse directions, as is explained in detail below.

Figure 2:
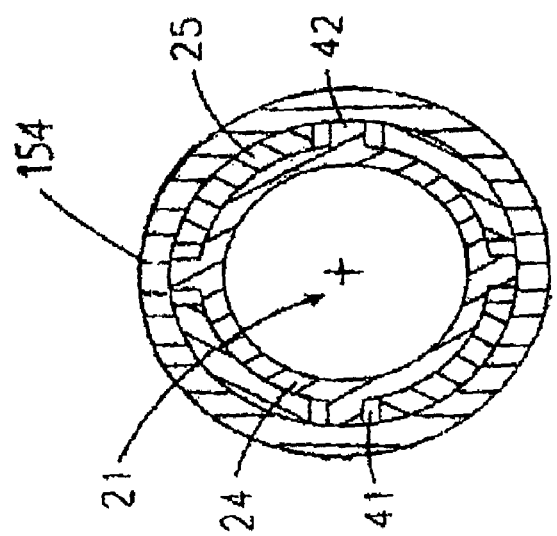
FIG. 2 is a cross-sectional view along line 2—2 of FIG. 1.

As shown in FIGS. 1 and 2, the primary belt wheel 1 consists of a primary movable half-wheel 12 and a primary fixed half-wheel 13. The primary movable half-wheel 12 is set about the primary axis 11, glidingly movable along the primary axle 9. The primary fixed half-wheel 13 is fixed about the primary axis 11, being taken along by a rotating movement about the primary axis 11. In the same way, the secondary belt wheel 2 consists of a secondary fixed half-wheel 22 and a secondary movable half-wheel 23. The secondary fixed half-wheel 22 is fixed on the secondary fixed axle 24, which in turn is connected about the secondary axis 21, so that the secondary fixed axle 24 rotates along with the secondary fixed half-wheel 22 to output power. The secondary movable half-wheel 23 is set on a movable axis 25, which is glidingly connected with the fixed axle 24. The transmission belt 3 transmits torque from the primary belt wheel 1, rotating at a primary speed, to the secondary belt wheel 2 to rotate at a secondary speed. The torque cam assembly 4 comprises guiding openings 41 and projecting bolts 42. The guiding openings 41 are cut into a peripheral surface of the movable axle 25 at four angular positions. Each of the guiding openings 41 is roughly shaped like the letter L with a central corner, a rear wall 43 and a front wall 44. Each of the projecting bolts 42 has an inner end that glidingly passes through the fixed axle 24 and an outer end that extends into one of the guiding openings 41 near the rear wall 43 or the front wall 44 thereof. Preferably, the outer end of the projecting bolts 42 have rolls to reduce friction when moving within the guiding openings 41.

The primary movable half-wheel 12 houses centrifugal blocks 14 and has a back plate 15 with a curved surface 151 bent outward in a central area. When the primary movable half-wheel 12 rotates, resulting centrifugal forces drive the centrifugal blocks away from the primary axis 11 along the curved surface 151, in turn shifting the primary movable half-wheel 12 along the primary axis.

The secondary axis 21 has an end carrying an elastic plate 26. A spring 27 is inserted between the elastic plate 26 and the secondary movable half-wheel 23, pushing the secondary movable half-wheel 23 towards the secondary fixed half-wheel 22.

Furthermore, the surfaces of the primary movable and fixed wheels 12, 13 that face each other and the surfaces of the secondary fixed and movable wheels 22, 23 that face each other are respectively inclined, forming beds with V-shaped cross-sections over which the transmission belt 3 runs.

The torque cam assembly 4 is surrounded by a casing 154, shown in a cross-sectional view of the casing in FIG. 2 (not shown in FIG. 1, 3–10) to prevent the projecting bolts 42 from falling out of the guiding openings 41.

Figure 3:
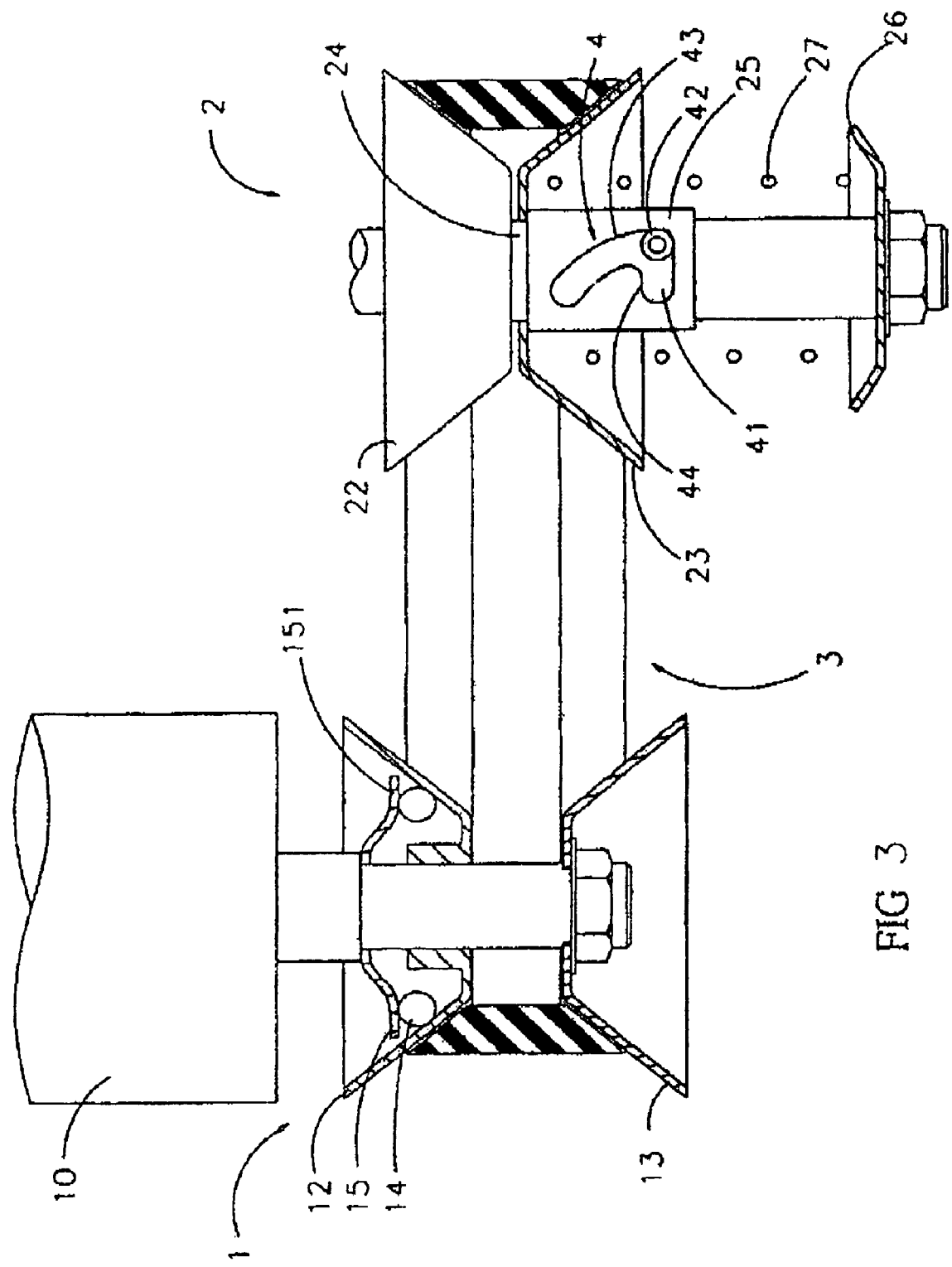
FIG. 3 is a schematic illustration of the bidirectional continuous power transmission system of the present invention at low speed.

Referring to FIG. 3, during low power output of the power source 10, the primary axis rotates slowly, small centrifugal forces act on the centrifugal blocks 14, and the primary moving half-wheel 12 stays away from the primary fixed half-wheel 13, so that the primary wheel 1 has a relatively small effective radius. The secondary wheel 2 has a relatively large effective radius by the elastic force of the spring 27 which pushes the secondary movable half-wheel 23 against the secondary fixed half-wheel 22 and the projecting bolts 42 respectively towards the central corners at the rear walls 43 of the guiding openings 41.

While the secondary movable half-wheel 23 and the secondary fixed half-wheel 22 rotate together, due to the load on the secondary fixed half-wheel 22 by the secondary fixed axle 24, there is a delay of the secondary fixed half-wheel 22, rotating behind the secondary movable half-wheel 23 at an angular difference, causing the projecting bolts 42 to lean against rear walls of the rear walls 43. Thereby the secondary movable half-wheel 23 is pushed torward the secondary fixed half-wheel 22, with the transmission belt 3 supported by two tightly connected half-wheel under high friction, driving the secondary fixed axle 24.

Figure 4:
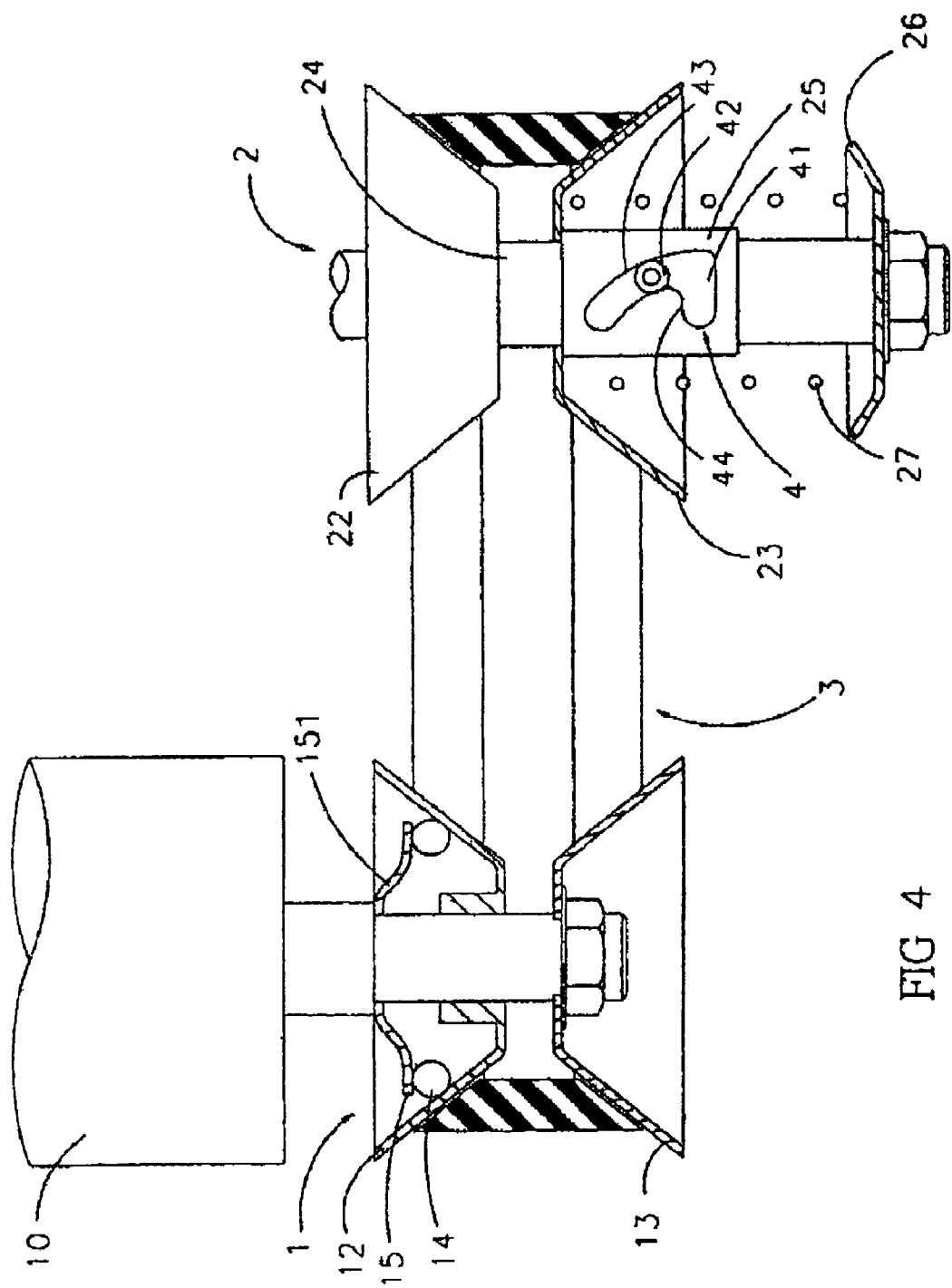
FIG. 4 is a schematic illustration of the bidirectional continuous power transmission system of the present invention at medium speed.

Referring to FIG. 4, at medium speed increased centrifugal forces act on the centrifugal blocks 14, causing the primary moving half-wheel 12 to draw closer to the primary fixed half-wheel 13, so that the primary wheel 1 has a larger effective radius. The secondary wheel 2 has a reduced effective radius, with the secondary movable half-wheel 23 pushing against the elastic force of the spring 27 and the projecting bolts 42 moving along the rear walls 43 of the guiding openings 41, respectively, until equilibrium positions are reached.

Figure 5:
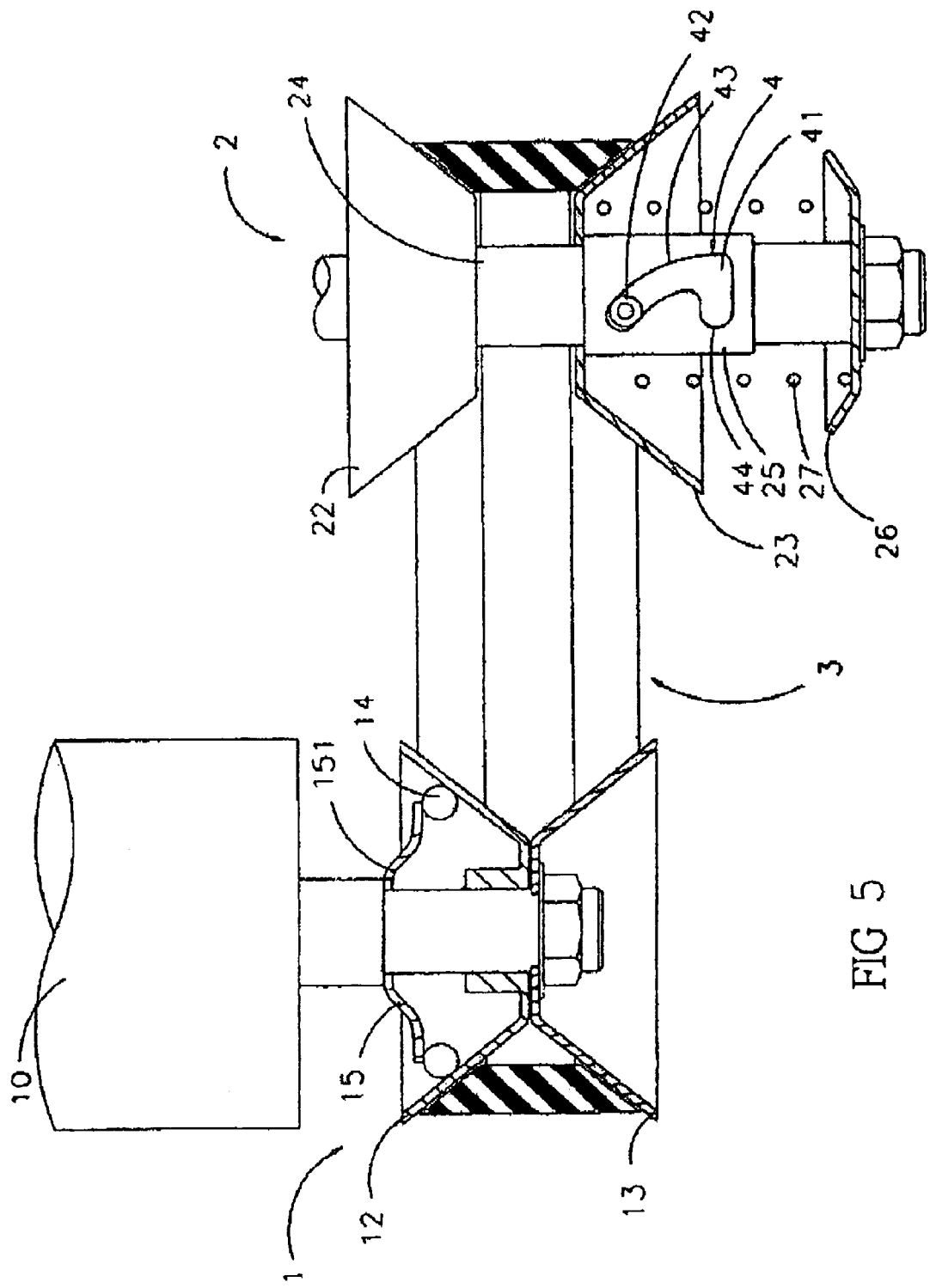
FIG. 5 is a schematic illustration of the bidirectional continuous power transmission system of the present invention at high speed.

Referring to FIG. 5, at high speed large centrifugal forces act on the centrifugal blocks 14, causing the primary moving half-wheel 12 to draw next to the primary fixed half-wheel 13, so that the primary wheel 1 has a maximum effective radius. The secondary wheel 2 then has a minimum effective radius, with the secondary movable half-wheel 23 pushing against the elastic force of the spring 27 and power being transmitted due to friction in the torque cam assembly 4.

Figure 6:
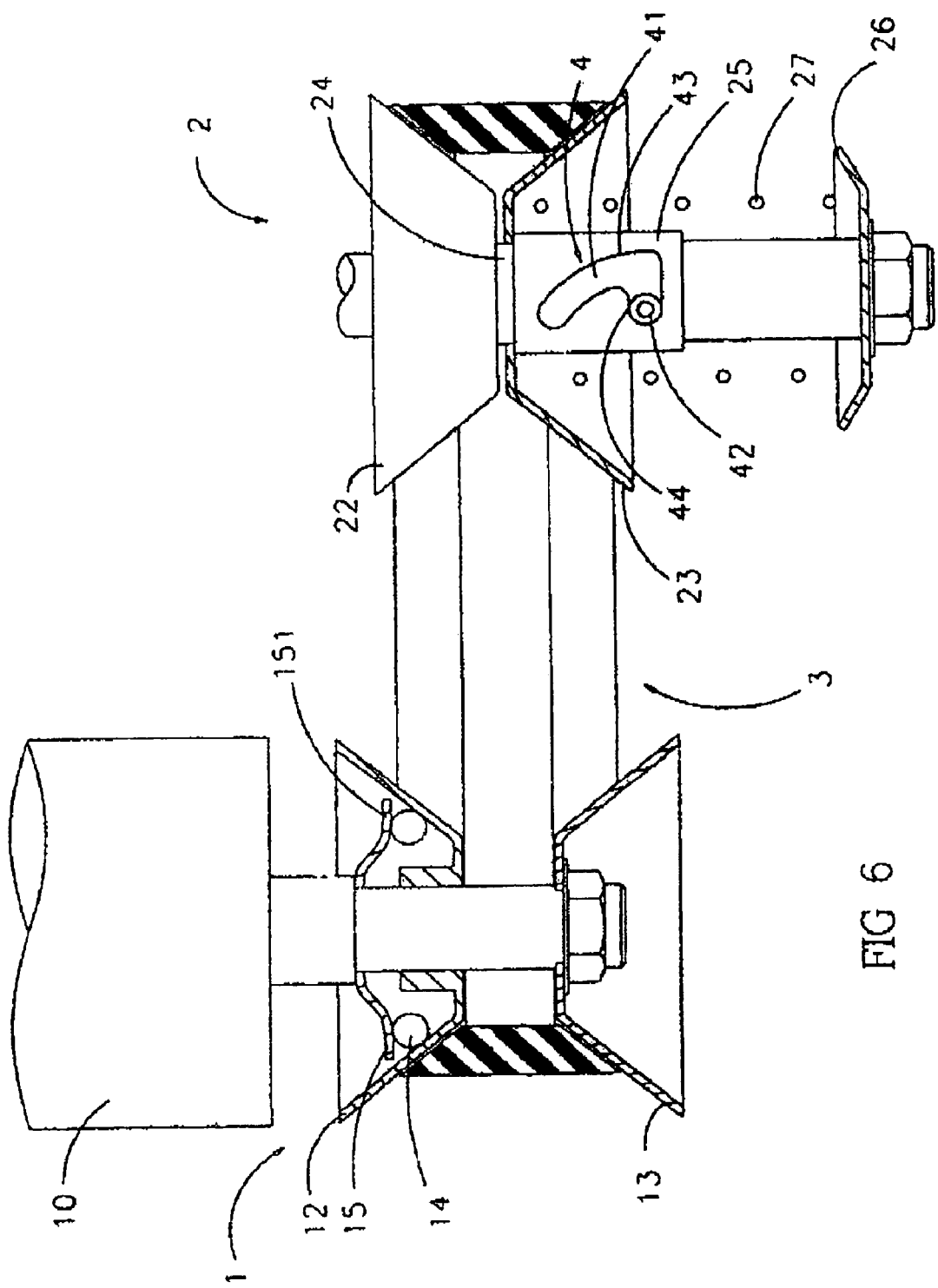
FIG. 6 is a schematic illustration of the bidirectional continuous power transmission system of the present invention during rotation in reverse direction.

Referring to FIG. 6, upon rotation in reverse direction, the primary axle 9 drives the transmission belt 3 in reverse direction. At this time, the projecting bolts 42 respectively extend into the front walls 44, causing the secondary fixed axle 24 to output torque in reverse direction.

Figure 7:
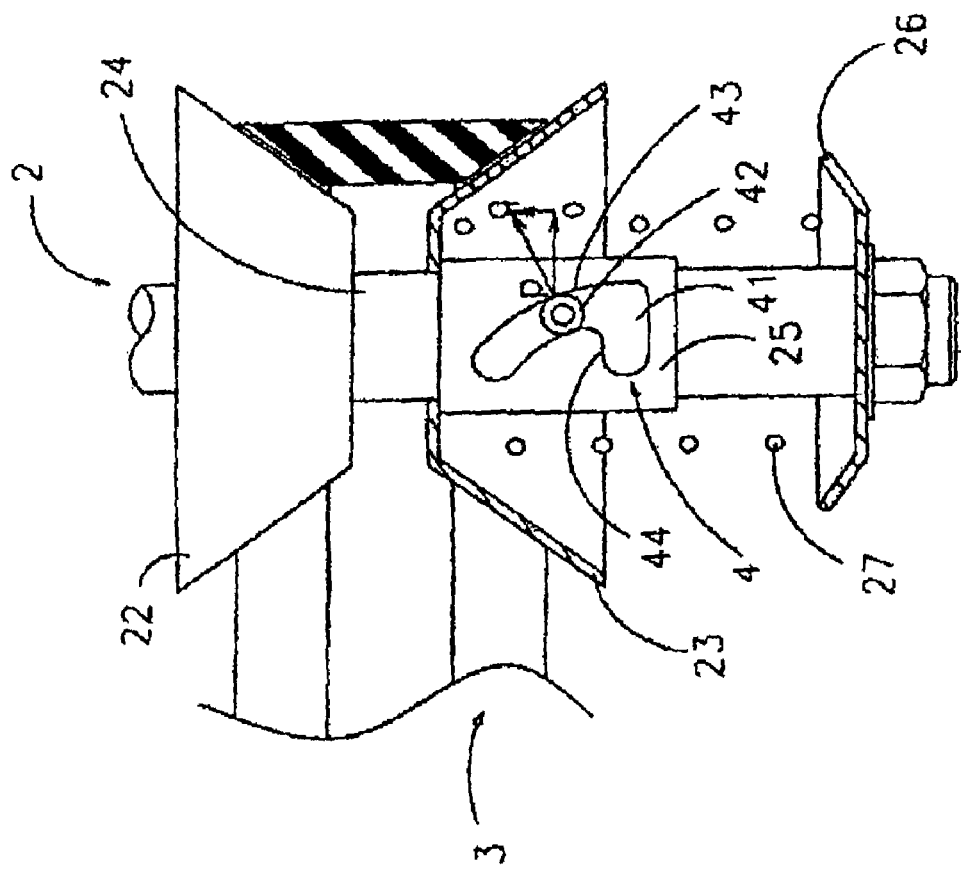
FIG. 7 is a schematic illustration of the torque cam assembly of the present invention during rotation in positive direction.

The principle of operation of the present invention is as follows. As shown in FIG. 7, during operation in positive direction, the projecting bolts 43 have contact points p at which forces pq are exerted on the guiding openings 41, respectively. The force pq has a component po oriented perpendicular to the secondary axis 21 and a component oq oriented parallel to the secondary axis 21. The component oq pushes the secondary movable half-wheel 23 towards the transmission belt 3 along the secondary axis 21, so that high friction between the secondary wheel 2 and the transmission belt 3 results and torque is effectively transmitted. The component po causes the projecting bolts 42 respectively to engage with the rear walls 43, so that the secondary movable and fixed half-wheels 23, 22 rotate together.

Referring to FIG. 8, upon rotation in reverse direction, the projecting bolts 42 respectively engage with the front walls 44 at contact points i, exerting forces with components ij oriented perpendicular to the secondary axis 21, thereby keeping the movable secondary half-wheel 23 at a fixed position for a well-defined speed ration of transmission.

As shown in FIGS. 9a–9d, the present invention allows adaption to all types of driving apparatuses. In further embodiments of the present invention, the rear walls 43 and the front walls 44 of the guiding openings 41 have other curvatures so that different speed ratios of transmission in positive and reverse directions result.

Referring again to FIG. 9a, in a second embodiment of the present invention, front walls 44a allow for variable speed ratios of transmission in reverse direction to adapt to varying load. As shown in FIG. 9b, in a third embodiment of the present invention, front walls 44b has a convex curvature with finite radii to adapt to changes of torque, first with a high, then with a lower speed ratio. As shown in FIG. 9c, in a fourth embodiment of the present invention, rear walls 43c have infinite curvature radii for a continuous change of speed ratios towards lower speed ratios, while front walls 44c have higher curvatures than the rear walls 43c for continuous lowering of the speed ratio. As shown in FIG. 9d, in a fifth embodiment of the present invention, rear walls 43d have finite reverse curvature radii to adapt to changes of torque, first with slow secondary speed, then with fast secondary speed, while front walls 44d have incisions which, upon rotation in reverse direction, respectively engage with projecting bolts 42d, keeping the speed ratio of transmission constant.

Referring now to FIG. 10, which is a diagram of secondary speed plotted against primary speed, independent from the direction of rotation, at low primary speed a maximum torque ratio, i.e., a minimum speed ratio prevails. Beyond a certain value of the primary speed, a maximum speed ratio is adjusted to. In the range of primary speeds in between, the speed ratio of transmission continuously changes from low to high values. Thus with minimum cost a continuous power transmission system is implemented which works in conjunction with every type of power source.

As the above explanation shows, the present invention employs a guiding opening 41 that allows to reverse directions, providing a continuous power transmission system operating bidirectionally, without any need for an additional reverse gear. The guiding opening 41 is given a shape according to demands for the speed ratio of transmission. So application of the present invention in all types of machine tools and vehicles is possible with good effect.

While the invention has been described with reference to preferred embodiments thereof, it is to be understood that modifications or variations may be easily made without departing from the spirit of this invention which is defined by the appended claims.

The invention claimed is:

1. A bidirectional continuous power transmission system, comprising:
    a primary wheel, consisting of a primary fixed half-wheel and a primary movable half-wheel, mounted on a primary axle about a primary axis connected with a power source, and rotating either in a positive direction or in a reverse direction;
    a secondary wheel, consisting of a secondary fixed half-wheel and a secondary movable half-wheel, and mounted on a secondary fixed axle about a second axis;
    a transmission belt, running over said primary wheel and said secondary wheel, so that said primary wheel, running at a primary speed, drives said secondary wheel to run at a secondary speed; and
    a torque cam assembly, mounted on said secondary wheel and further comprising
        a projecting bolt, having an inner end that is attached to said secondary fixed half-wheel, and an outer end, and
        a guiding opening at said secondary movable half-wheel, passed through by said outer end of said projecting bolt, and having a rear wall and a front wall each having different curvatures that operate to effect different speed ratios of transmission in positive and reverse directions;
    wherein, when said primary wheel rotates in said positive direction, said projecting bolt leans against said rear wall of said guiding opening, causing said secondary fixed axle to rotate in said positive direction, and, when said primary wheel rotates in said reverse direction, said projecting bolt leans against said front wall of said guiding opening, causing said secondary axis to rotate in said reverse direction, so that bidirectional continuous power transmission is achieved.

2. The bidirectional continuous power transmission system according to claim 1, wherein centrifugal blocks and a back plate with a curved surface are mounted on said primary wheel, with said back plate determining axial positions of said centrifugal blocks, so that a variable effective radius of said first wheel plate results.

3. The bidirectional continuous power transmission system according to claim 1, wherein said secondary fixed half-wheel is fastened to said secondary fixed axle which in turn is connected about said secondary axis, and said secondary movable half-wheel is fastened to a movable axle which is glidingly connected with said secondary fixed axle.

4. The bidirectional continuous power transmission system according to claim 1, wherein an elastic plate is mounted close to one end of said secondary fixed axle and a spring is inserted between said elastic plate and said movable axle, pushing said secondary movable half-wheel towards said secondary fixed half-wheel.

5. The bidirectional continuous power transmission system according to claim 4, wherein said elastic plate is a spring.

6. The bidirectional continuous power transmission system according to claim 1, wherein said power source is an engine.

7. The bidirectional continuous power transmission system according to claim 1, wherein said power source is a motor.

8. The bidirectional continuous power transmission system according to claim 1, wherein said power source is an oil pressure system or a fluid pressure system.

9. The bidirectional continuous power transmission system according to claim 1, wherein said transmission belt has a V-shaped cross-section or is a composite belt of metal alloys.

10. The bidirectional continuous power transmission system according to claim 1, wherein said guiding opening is shaped like the letter L.

11. The bidirectional continuous power transmission system according to claim 1, wherein said torque cam assembly comprises multiple projecting bolts and guiding opening, arranged symmetrically on said secondary movable axle.

12. The bidirectional continuous power transmission system according to claim 1, wherein said projecting bolt on said outer end thereof carries a roll.

13. The bidirectional continuous power transmission system according to claim 1, wherein said projecting bolt, during rotation of said secondary wheel both in said positive direction and said reverse direction exerts a force having a component parallel to said secondary axis and a component perpendicular to said secondary axis.

14. The bidirectional continuous power transmission system according to claim 1, wherein said torque cam assembly is a multiple system mounted on said secondary wheel.

15. The bidirectional continuous power transmission system according to claim 1, further comprising:
   at least two torque cam assemblies each mounted on said secondary wheel in a symmetric arrangement about said secondary fixed axle.

16. The bidirectional continuous power transmission system according to claim 15, further comprising:
   a plurality of projecting bolts associated with a plurality of openings each mounted on said secondary fixed axle, passing through said movable axle.

17. The bidirectional continuous power transmission system according to claim 1, wherein said torque cam assembly is housed in a casing.

18. The bidirectional continuous power transmission system according to claim 17, wherein said casing is made of plastics or metal alloy.

* * * * *